(12) United States Patent
Shires (10) Patent No.: US 6,178,101 B1
(45) Date of Patent: Jan. 23, 2001

(54) POWER SUPPLY REGULATION (75) Inventor: Jerry O. Shires, Plano, TX (US)

(73) Assignee: Unitron, Inc., Dallas, TX (US)

( * ) Notice: Under 35 U.S.C. 154(b), the term of this patent shall be extended for 0 days.

(21) Appl. No.: 08/912,294

(22) Filed: Aug. 15, 1997

(51) Int. Cl.[7] .............. H02M 1/12; G05F 5/00
(52) U.S. Cl. .............. 363/39; 363/40; 323/225; 323/300
(58) Field of Search ............. 363/86, 89, 127, 363/16, 17, 34, 36, 37, 39–48, 97, 98, 131, 132; 323/222, 225, 237, 244, 299, 300

(56) References Cited

U.S. PATENT DOCUMENTS

| | | | |
|---|---|---|---|
| 3,796,941 | 3/1974 | Danz et al. ................. | 321/5 |
| 3,845,374 | 10/1974 | Clarady et al. .............. | 318/445 |
| 4,286,314 | 8/1981 | Molyneux-Berry .......... | 363/55 |
| 4,412,277 | * 10/1983 | Mitchell ..................... | 363/89 |
| 4,471,855 | 9/1984 | Nomura ...................... | 363/69 X |
| 4,553,199 | 11/1985 | Harada et al. ............... | 363/75 |
| 4,672,526 | 6/1987 | Mehnert et al. ............. | 363/69 |
| 4,677,366 | 6/1987 | Wilkinson et al. .......... | 323/222 |
| 4,891,746 | 1/1990 | Bowman et al. ............. | 363/131 |
| 4,928,038 | * 5/1990 | Nerone ....................... | 315/209 R |
| 4,940,929 | 7/1990 | Williams .................... | 323/222 |
| 5,119,283 | 6/1992 | Steigerwald et al. ........ | 363/37 |
| 5,262,932 | 11/1993 | Stanley et al. .............. | 363/26 |
| 5,315,497 | 5/1994 | Severubsjy ................. | 363/34 |
| 5,446,647 | * 8/1995 | Ikeda et al. ................. | 363/89 |
| 5,486,993 | 1/1996 | Sakurai et al. .............. | 363/98 |
| 5,502,630 | 3/1996 | Rokhvarg .................... | 363/84 |
| 5,526,252 | * 6/1996 | Erdman ....................... | 363/97 |
| 5,654,880 | * 8/1997 | Brkovic et al. .............. | 363/17 |
| 5,742,493 | * 4/1998 | Ito et al. ..................... | 363/89 |

* cited by examiner

Primary Examiner—Jessica Han
(74) Attorney, Agent, or Firm—Howison Chauza Handley & Arnott; Gregory M. Howison (57) ABSTRACT A power supply provides a regulated power factor load to a primary power source, and thus low input current distortion, by monitoring: (A) The input voltage; (B) The power source current, not at the input to the power supply, but rather at a point downstream of an EMI filter and a shunt capacitance in the power supply; and (C) The output DC voltage. The power supply uses these inputs to control the power switching transistors to regulate the phase and amplitude of the monitored current. The phase of the monitored current is controlled primarily by the phase of the input voltage. A differentiating circuit in the feedback loop of the power supply control circuitry causes the monitored current to lag the input voltage by an amount equal to the lead induced in the phase of the input current by the EMI filter and shunt capacitor so that the actual input current to the power supply is in phase with the input voltage.

9 Claims, 13 Drawing Sheets

POWER SUPPLY REGULATION

TECHNICAL FIELD OF THE INVENTION

The present invention pertains to power supplies, and, more particularly, to power supplies with power factor correction (PFC) involving both the limitation of the input current distortion and the phase relationship between the input current and the input voltage.

BACKGROUND OF THE INVENTION

Power supplies, in order to be most efficient, must provide a load to the primary power source such that the power factor of the voltage and current into the power supply is close to 1.0. Any degradation of this power factor results in power which is not available to the power supply, and thereby requires the primary power source to be able to provide more apparent power than the actual power necessary. As a result power factor input specifications, such as IEEE 519, are more and more being placed on power supplies.

The power factor, the real power divided by the apparent power, is determined principally by two factors: The phase relationship between the voltage and current, and the distortion of the current.

SUMMARY OF THE INVENTION

In accordance with the invention, a power supply monitors both the voltage applied to the power supply input and the current transferred between the power source and the power supply and regulates the current transferred so that the input current has substantially the same waveform as the input voltage and is substantially in phase with the input voltage.

BRIEF DESCRIPTION OF THE DRAWINGS

The aforementioned and other features, characteristics, advantages, and the invention in general will be better understood from the following more detailed description taken in conjunction with the accompanying drawings, in which.

It will be appreciated that for purposes of clarity and where deemed appropriate, reference numerals have been repeated in the figures to indicate corresponding features.

DETAILED DESCRIPTION OF THE INVENTION

Figure 1:
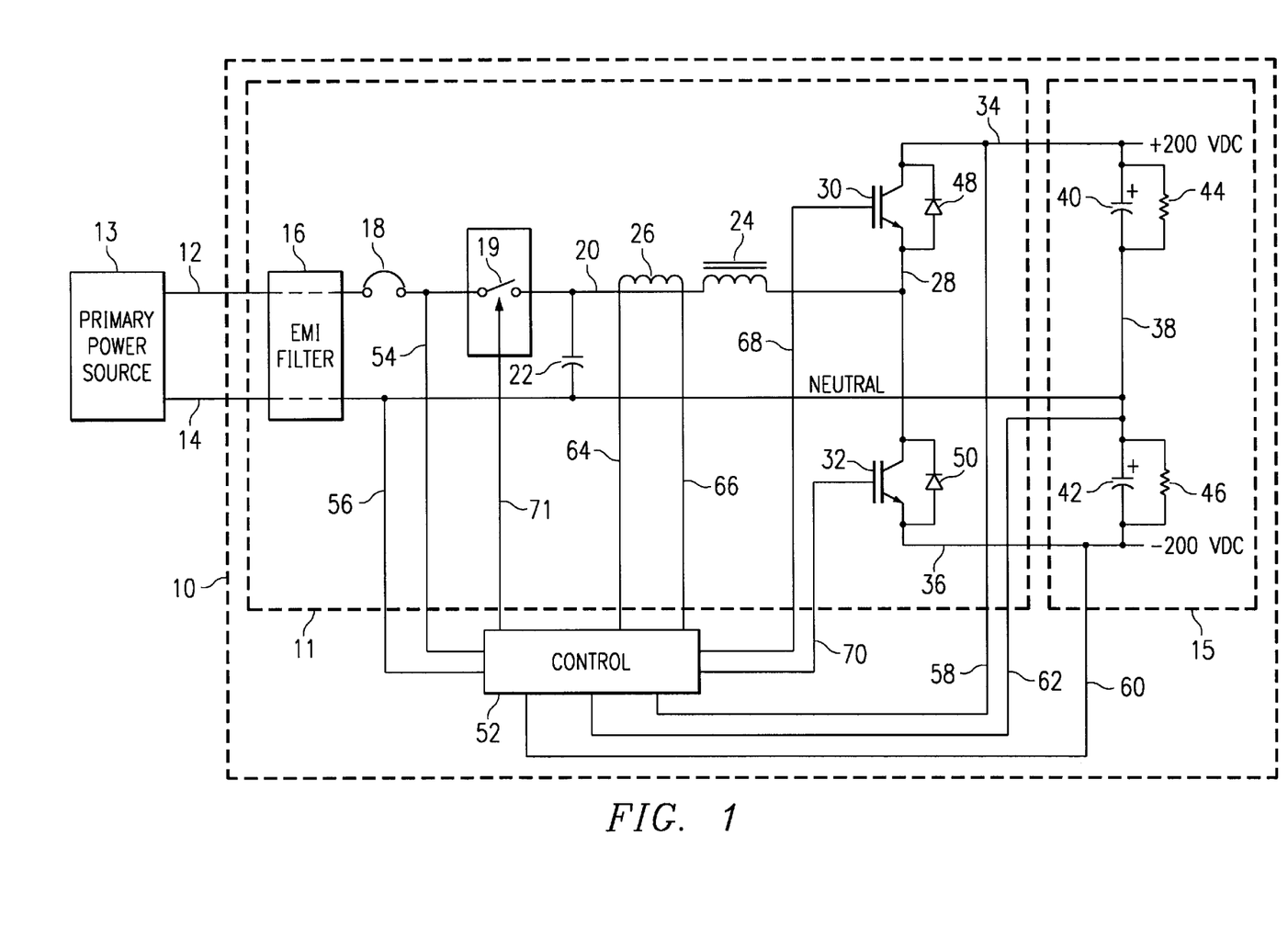
FIG. 1 is a partial block diagram, partial schematic diagram, of a power supply according to the present invention.

Referring to FIG. 1, power supply 10 is shown according to the present invention that provides a high degree of regulation of the input power factor and thus provides low distortion of the input current to the power supply and close matching of the phase of the input voltage and the input current. Power supply 10 has an input section 11 and a capacitor section 15. A 115 VAC, 400 HZ, an input voltage is supplied across input terminals 12 and 14 from, for example, primary power source 13. Terminal 14 is neutral. Terminal 12 is connected to EMI filter 16, the output of which, in turn, is coupled through circuit breaker 18 and static switch 19 to node 20 which is also connected to shunt-to-neutral capacitor 22 and to inductor 24. The current from node 20 into inductor 24 is measured by a current sensor 26 (sometimes referred to herein as a current monitor).

The other end of inductor 24 is connected to node 28 to which is also connected the emitter of N-channel IGBT switching transistor 30 and the collector of N-channel IGBT switching transistor 32. The collector of transistor 30 is connected to a positive DC voltage node 34, and the emitter of transistor 32 is connected to a negative DC voltage node 36. Nodes 34 and 36 are each coupled to neutral node 38 through capacitors 40 and 42 respectively. A pair of resistors 44 and 46 are coupled across capacitors 40 and 42, respectively. A pair of diodes 48 and 50 are connected from the emitter to the collectors of transistors 30 and 32, respectively, with the anodes of the diodes connected to the respective emitters.

Control circuit 52 receives the input voltage on lines 54 and 56; has inputs from nodes 34, 36, and 38 on lines 58, 60, and 62, respectively; and has inputs on lines 64 and 66 from current sensor 26. Control circuit 52 controls the gates of transistors 30 and 32 through lines 68 and 70 respectively and switch 19 on line 71.

In operation an input voltage of 115 volts AC at 400 HZ is provided by primary power source 13 into terminals 12 and 14. The terminal 12 voltage is coupled through EMI filter 16, circuit breaker 18, and switch 19 onto node 20, and through inductor 24 onto node 28. Switching transistors 30 and 32 are controlled by control circuit 52 to operate as rectifiers in the boost mode to provide the DC voltage across nodes 34 and 36. Static switch 19 isolates input terminal 12 from node 20 at startup, and circuitry (not shown) inside control circuit 52 precharge capacitors 40 and 42 to the peak input voltages through a relatively high impedance so that when static switch 19 becomes conductive, the initial inrush current will be substantially less than if capacitors 40 and 42 were uncharged. After capacitors 40 and 42 are precharged, static switch 19 is turned on at the zero crossing of the input voltage at terminals 12 and 14.

Figure 2:
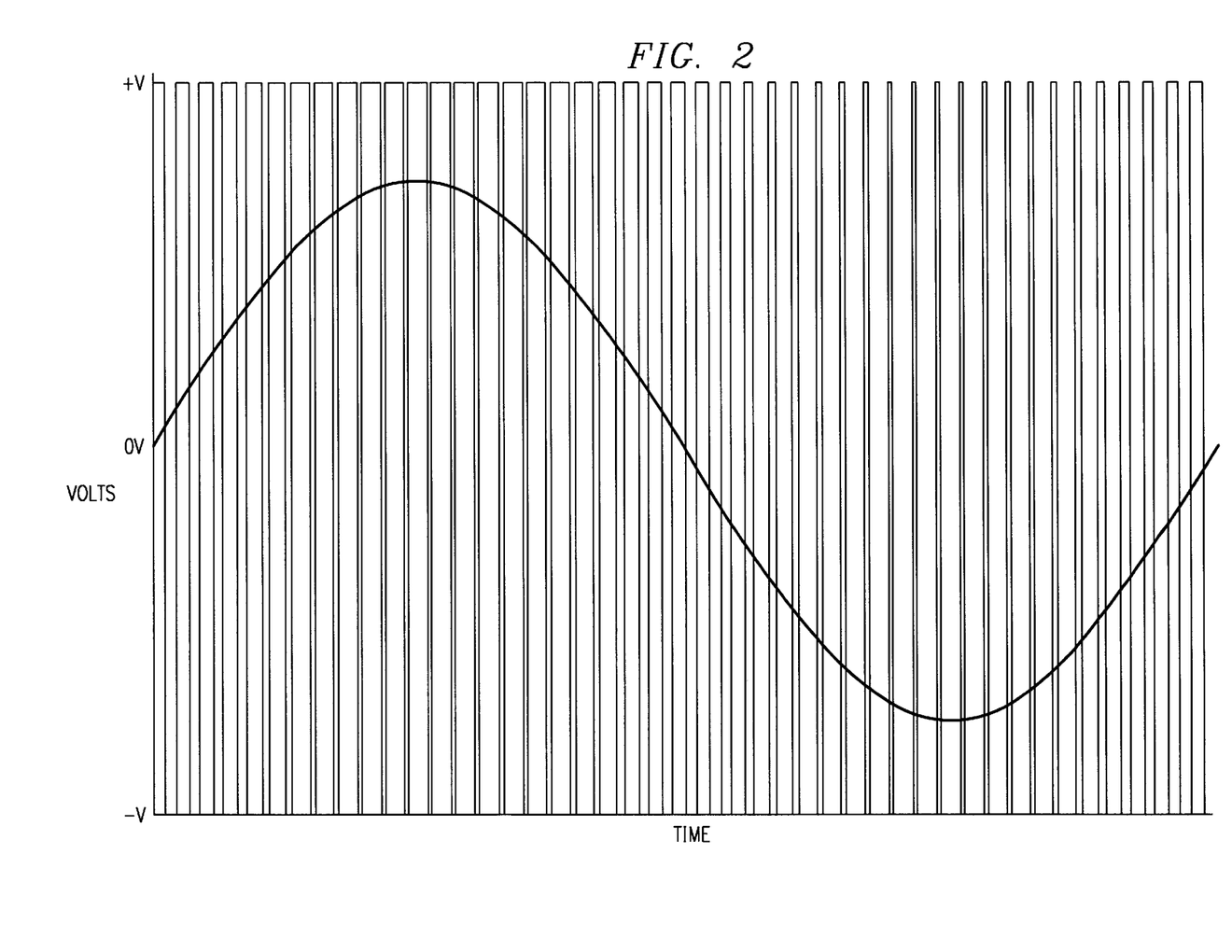
FIG. 2 is a diagram of a sine wave superimposed on a pulse width modulated signal which, when used to control the gates of two IGBT (Insulated Gate Bipolar Transistor) switching transistors in series produces the sine wave after low pass filtering.

Control circuit 52 monitors the input voltage, the output DC voltage and the current through the inductor 24 to switch the gates of transistors 30 and 32 either fully on (in saturation) or completely off. More specifically, control circuit 52 generates an internal 18 kHZ signal which is used to adjust the gate drive to transistors 30 and 32 18,000 times a second or once every 55.55 µs. During each 55.55 µs time period one of transistors 30 and 32 is first turned on for a portion of the 55.55 µs period, and then the other transistor is turned on for the remainder of the 55.55 µs period. At no time are transistors 30 and 32 both on at the same time. By varying the relative on times of the two transistors the current through the inductor 24, and therefore from the primary power source can be controlled. As an example, FIG. 2 shows a sine wave voltage which is superimposed over the gate drive signal for transistor 30. This gate drive signal produces a sine wave current through inductor 24. As can be seen in FIG. 2 transistor 30 is on longer when the voltage is positive, and is on for a shorter period of time when the voltage is negative, and is on 50% of the time when the voltage is zero. (The gate drive signals for transistor 32 is not shown but would be the inverse of the gate drive signals to transistor 30.) The amplitude of the current through inductor 24, which determines the power delivered through the power supply, is controlled by the ratio between the shortest on time and the longest on time of the transistors 30 and 32 over each cycle of operation.

If the input voltage and input current are in phase and the same waveform, then the power factor is 1.0 which is the desired result. However, the input current (into terminal 12) leads the current through inductor 24 due to the reactive components of EMI filter 16 and capacitor 22. Control circuit 52 compensates for this lead reactance using a differentiating circuit as described in detail below.

Figures 3, 5:
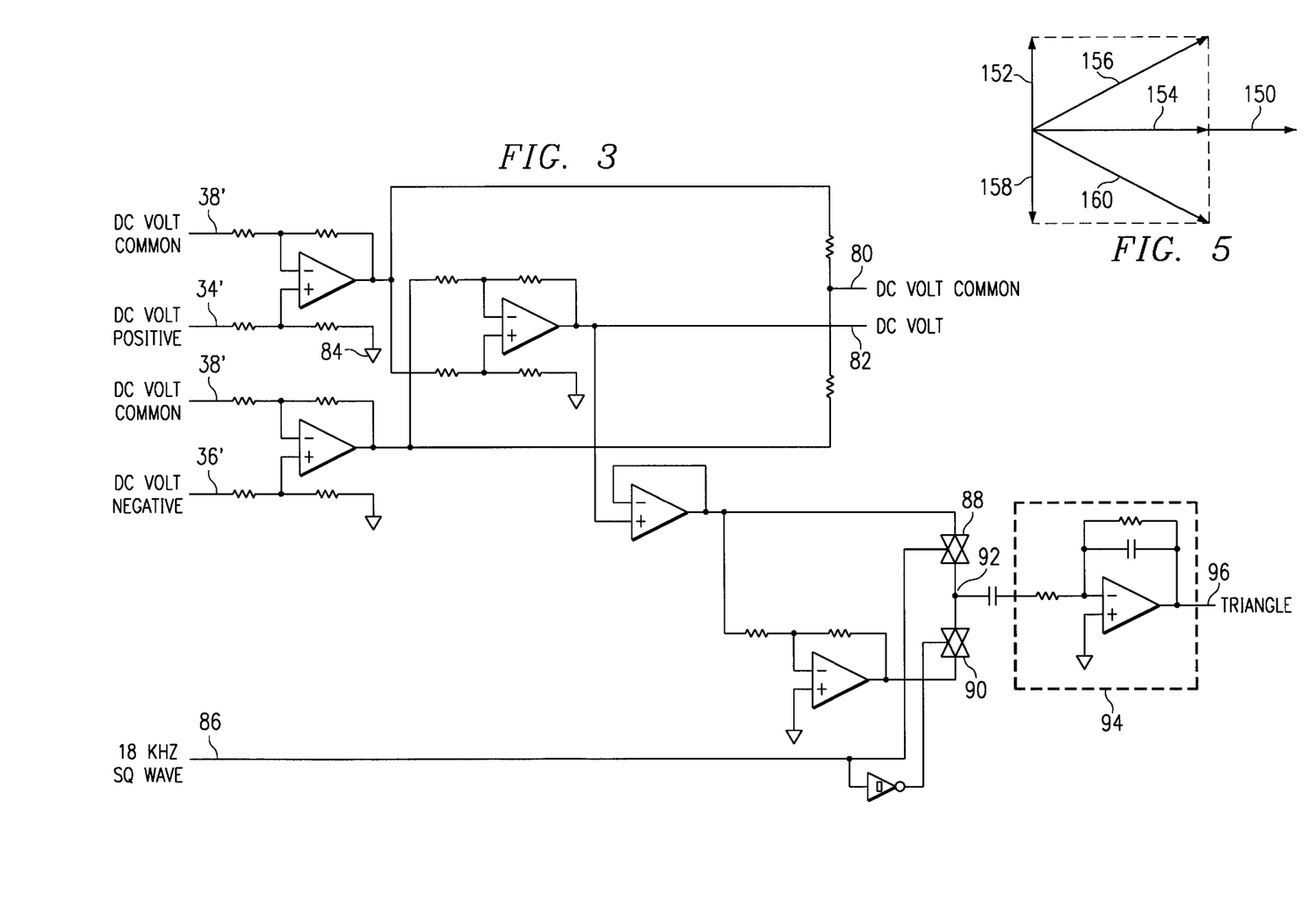
FIG. 3 is a schematic diagram of a first portion of the control circuit of the power supply shown in FIG. 1.
FIG. 5 is a phasor diagram applicable to the power supply circuit of FIG. 1.
Figure 4:
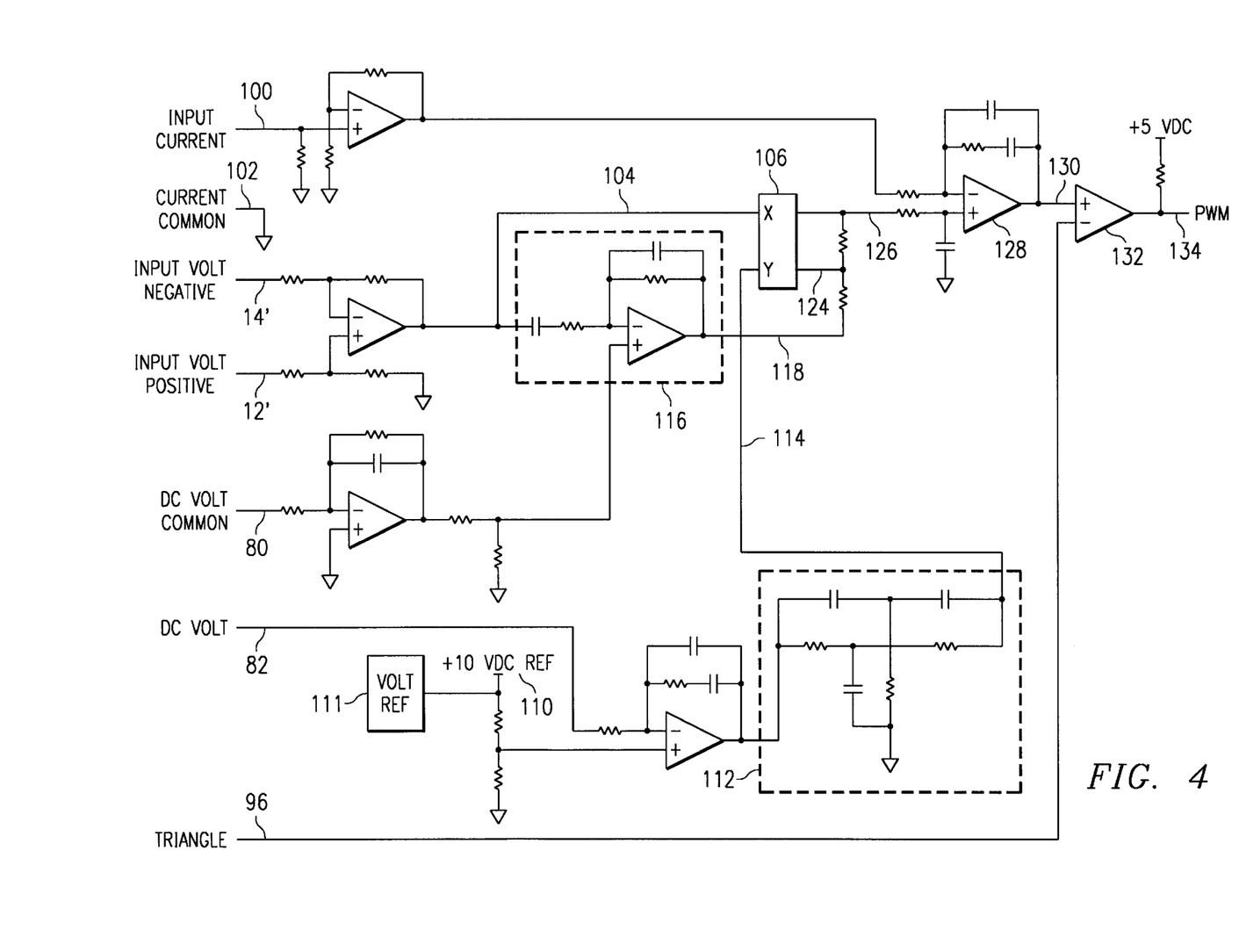
FIG. 4 is a schematic diagram of a second portion of the control circuit of the power supply shown in FIG. 1.

Control circuit 52 is shown in FIGS. 3 and 4. Referring to FIG. 3 the positive and negative DC voltages from nodes 34 and 36, respectively, are combined with the neutral from node 38 to provide a DC voltage signal on line 82 and a DC common voltage on line 80. Both signals on lines 80 and 82 are with respect to logic ground 84 shown as a triangle in the drawings. Neutral, for example at terminal 14, is isolated from logic ground 84. Also the primed reference numbers such as 34', 36' and 38' indicate that the unprimed and primed nodes are separated by series high voltage resistors so that the high voltages in the main section are not applied directly to the active elements in the control circuit 52.

An 18 kHZ square wave is applied to input line 86 and chops the DC voltage on line 82 using switches 88 and 90 to produce an 18 kHZ AC square wave at node 92 which has an amplitude proportional to the DC voltage on line 82. This square wave on node 92 is integrated in integrator 94 to produce a triangular waveform on line 96 which has a frequency of 18 kHZ and an amplitude proportion to the DC voltage between nodes 34 and 36 in FIG. 1.

FIG. 4 shows the remaining portion of control circuit 52. The current monitored through inductor 24 in current monitor 26 is applied to input current line 100 and input common line 102 from lines 64 and 66, respectively. The negative and positive input voltages, from lines 14 and 12, respectively, are combined to form an input voltage signal at node 104 which is applied to the X input of multiplier circuit 106, and to the input of differentiating circuit 116. The DC voltage common on line 80 is scaled and the scaled DC voltage common is applied as a reference voltage to differentiating circuit 116. The DC voltage on line 82 is compared to a reference voltage 110 provided by a reference voltage generating circuit 111, and the difference is passed through a twin tee notch filter 112, the output of which on line 114 is connected to the Y input of multiplier 106. The signal on line 114 is essentially a DC voltage which, when multiplied by the input voltage on node 104 provides a signal which is a replica of the input voltage to the power supply and which has an amplitude which is a function of the amplitude of the input voltage and the amplitude of the DC voltage. The signal at node 118, the output of the differentiating circuit 108, is a sinusoidal wave which lags the input voltage to power supply 10 by 90 degrees when the input voltage is a sinusoidal wave. The lagging signal on node 118 is added to the output of the multiplication operation at the Z input 124 to multiplier 106, which, in the preferred embodiment is an Analog Devices AD633 multiplier, to provide a signal on node 126 which is a sinusoidal wave which lags the input voltage to the power supply by some amount. This signal is then compared with the current signal on line 100 in operational amplifier 128 to produce an error signal at node 130 which is the difference between the current through inductor 24 and a phase compensated and amplitude adjusted input voltage to power supply 10. The signal at node 130 is then compared to the 18 kHZ triangular signal on line 96 in comparator 132 to form the pulse width modulated signal PWM on line 134. This signal is then used to drive the gates of transistors 30 and 32 through circuitry not shown in the drawings but known in the art.

The operation of control circuit 52, for purposes of the present invention, is to sense the input voltage to the power supply, the DC voltage across capacitors 40 and 42, and the current through inductor 24 to produce the pulse width modulated signals to control the gates of transistors 30 and 32. More specifically, the power supply input voltage is scaled and differentiated in differentiating circuit 108 to provide a lagging voltage which is then added to the power supply input voltage which has been multiplied by a factor derived from the DC voltage. The resultant voltage is an amplitude adjusted and phase shifted replica of the power supply input voltage which is then compared to the current through inductor 24 to provide an error signal. This error signal is then compared to the 18 kHZ triangular signal to form the pulse width modulated signal. The result is that the current through inductor 24 is phase shifted with respect to the input voltage to the power supply, but the amount of this phase shift is equal to the phase shift caused by the EMI filter 16 and capacitor 22 so that at the input to the power supply the voltage and current are in phase and with substantially the same waveform, and, therefore, the power factor of the power supply is close to 1.0, on the order of greater than 0.98 in prototype units with the input current distortion being less than 5%.

Twin tee notch filter 112 is set to band-stop frequencies around 110 HZ to isolate the regulation circuit from DC ripple voltage when the input or output voltage is 50 or 60 HZ single phase.

FIG. 5 is a phasor diagram of input voltage phase and input current phase showing the effect of the compensation of differentiating circuit 116. In FIG. 5 phasor 150 is the phase of the input voltage at terminal 12 which is the reference phase of the diagram, and the phase which is to be matched by the input current to the power supply 10 for maximum power factor and minimum input current distortion. Phasor 152 is the leading phase of power supply 10 input current as detected by current monitor 26 caused by reactive components in the current path before or upstream from current monitor 26. This reactance is due primarily to capacitor 22 and EMI filter 16. Phasor 154, which overlays phasor 150, is the phase of the current through current monitor 26 if differentiating circuit 116 were not present. Stated another way, without differentiating circuit 116, control circuit 52 would regulate the phase of the current through current monitor 26 such that the current phase would be the same as the input voltage phase. Phasor 156 represents what would be the resultant phase of the power supply input current without differentiating circuit 116. Phasor 158 represents the lagging phase caused by differentiating circuit 116, and phasor 160 represents the resulting phase of the current through current monitor 26. Phasor 154, with the inclusion of differentiating circuit 116 then represents the phase of the power supply 10 input current at input terminals 12 and 14. Although current monitor 26 is placed between capacitor 22 and inductor 24, it could be placed at other positions in the input AC current path, such as before capacitor 22. The advantage of placing it after capacitor 22 is that phasor 152 will always be leading, the lagging response of a differentiator can always be used to compensate for the reactance before current monitor 26. The length of phasor 158 is set in order to maximize the input power factor of power supply 10.

Figure 6:
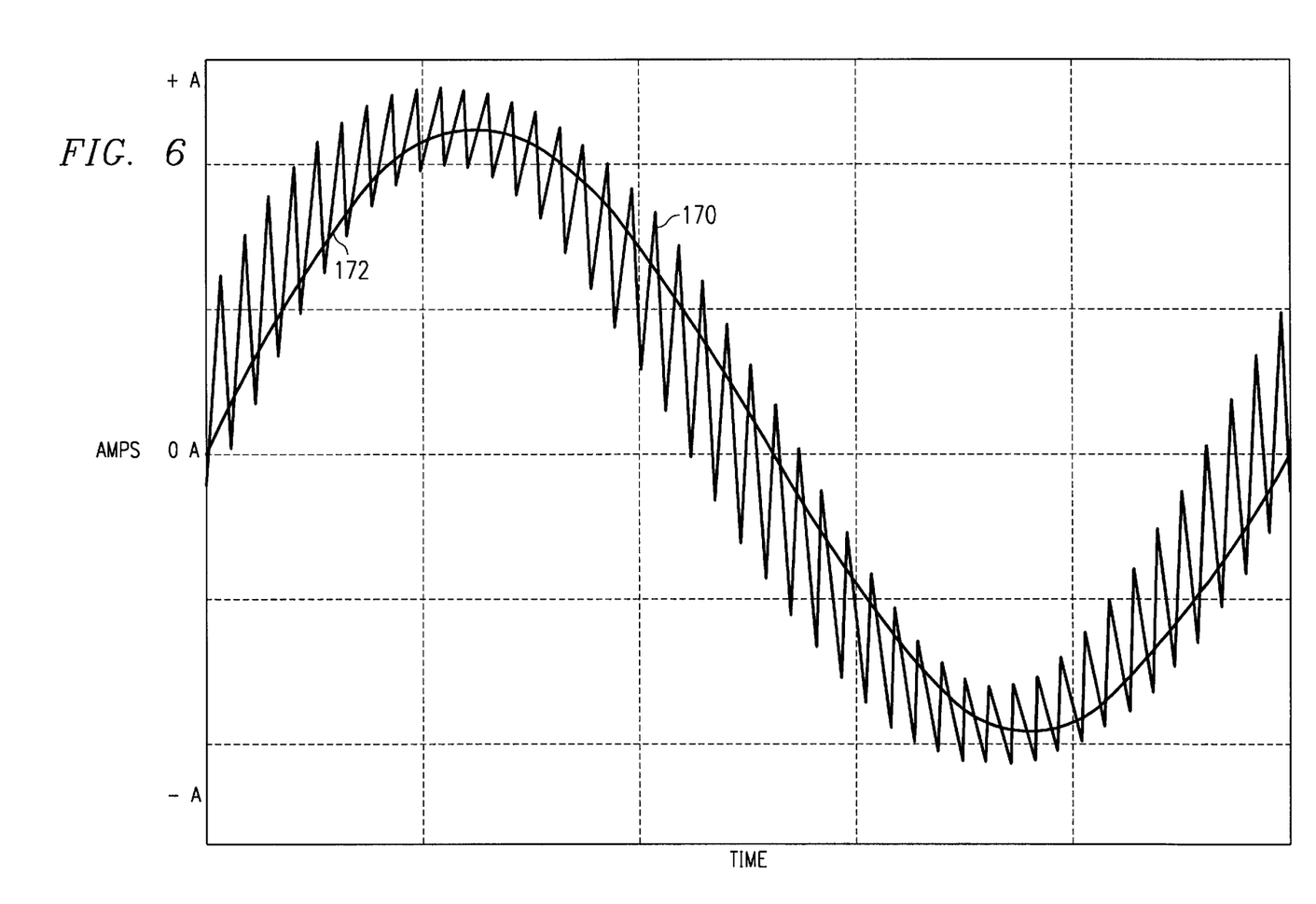
FIG. 6 is a diagram of the current through the inductor shown in FIG. 1 and the current into the power supply.

FIG. 6 shows current 170 through inductor 24 and input current 172. Current 170 is a triangular waveform and input current 172 is a smoother curve. As can be seen, the regulation puts 18 kHZ ripple onto the current. This ripple is substantially isolated from the input voltage source by EMI filter 16 and capacitor 22. In the preferred embodiment additional series inductor-capacitor combinations are shunted across capacitor 22 to trap 18 kHZ and 36 kHZ ripple and further isolate the input voltage to power supply 10.

Figure 7:
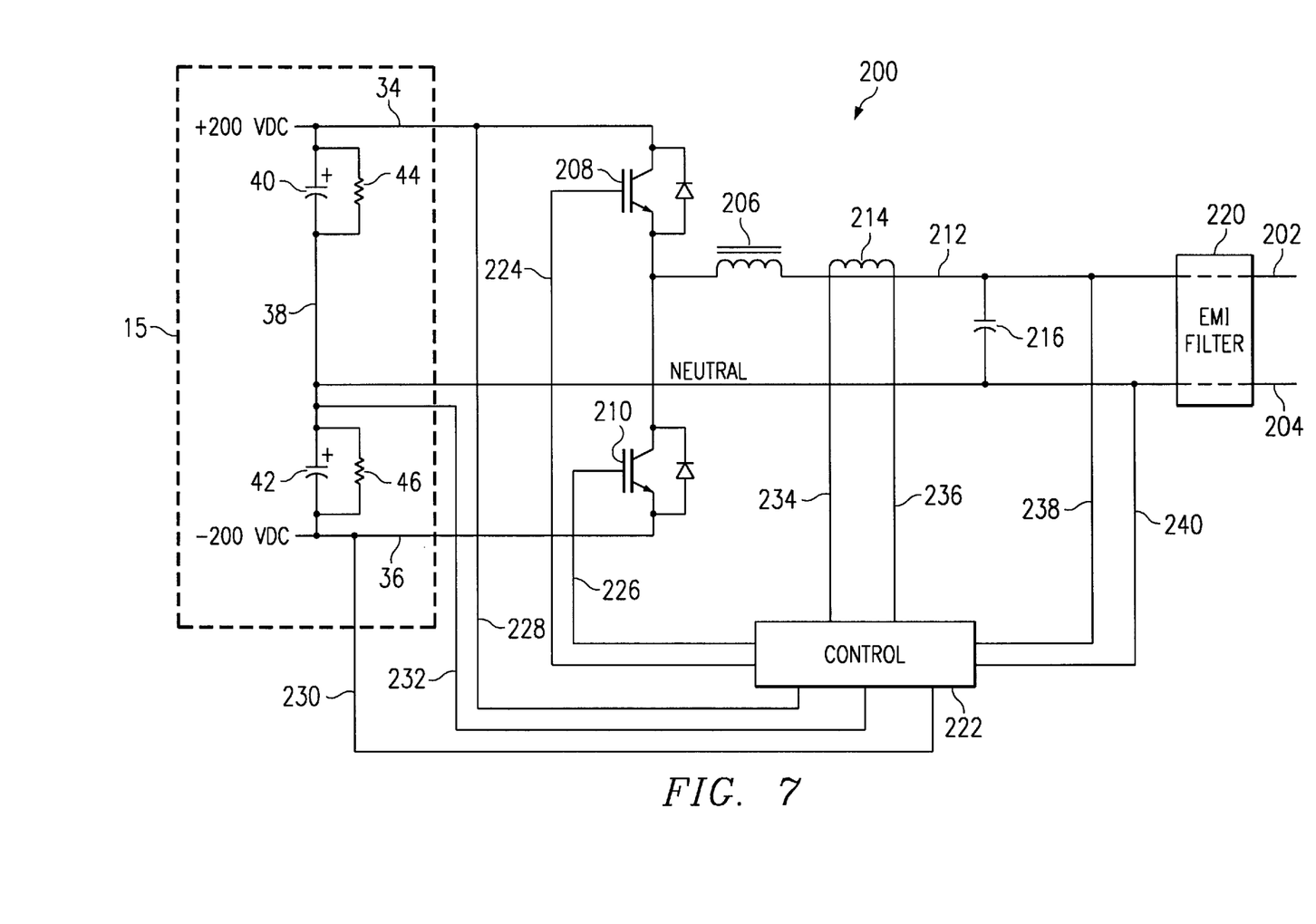
FIG. 7 is a partial block diagram, partial schematic diagram, of a power supply similar to the power supply of FIG. 1 used as an output power supply.

The power supply 10 of FIG. 1 can be modified to provide a regulated voltage out. FIG. 7 shows output power supply 200 which couples the voltage across capacitors 40 and 42 of capacitor section 15 onto output terminals 202 and 204 in a regulated manner. As shown in FIG. 7 the positive DC voltage at node 34 is selectively transferred onto inductor 206 through N-channel IGBT switching transistor 208, and the negative DC voltage at node 36 is selectively transferred onto inductor 206 through N-channel IGBT switching transistor 210. The other terminal of inductor 206 is coupled to node 212 through current sensor 214. Node 212 is coupled to neutral by capacitor 216 and coupled through EMI filter 220 to output terminal 202 with output terminal 204 connected to neutral. Control circuit 222 controls the gates of transistors 208 and 210 on lines 224 and 226, respectively, in response to inputs from the DC voltages at nodes 34, 36, and 38 on lines 228, 230, and 232, respectively, to inputs from current sensor 214 on lines 234 and 236, and to inputs from the output voltage at terminals 202 and 204 on lines 238 and 240, respectively.

The operation of power supply 200 is similar to the operation of power supply 10. Power supply 200 uses an internally generated AC reference signal to provide the proper waveform at output terminals 202 and 204, and the correction of the current phase with respect to the AC voltage is not utilized in this circuit. Power supply 10 of FIG. 1 operates in the boost mode. That is, the DC voltage is above the normally rectified value. Power supply 200 of FIG. 7 operates in the buck mode; that is, the output voltage can be reduced from the voltage that could usually be produced from the DC voltage. By the combination of power supply 10 and power supply 200 the output voltage of power supply 200 can exceed the input voltage to power supply 10.

Figure 8:
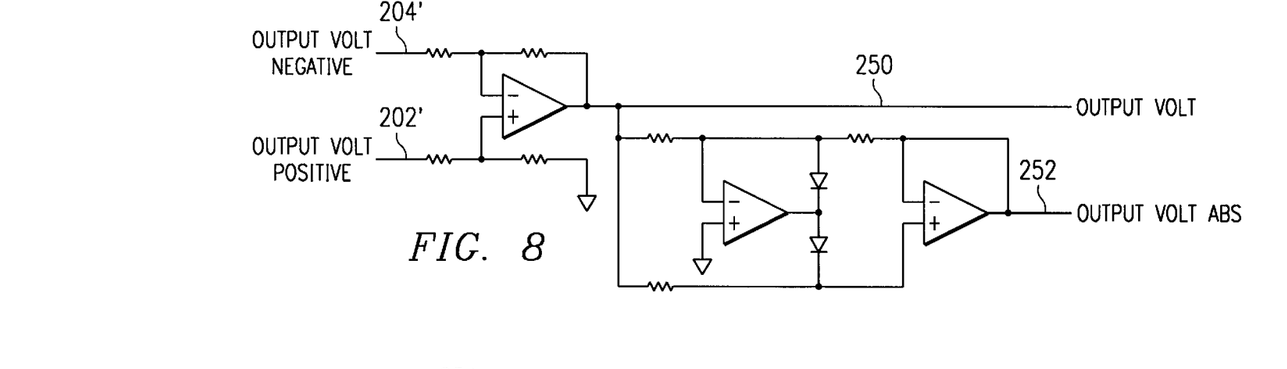
FIG. 8 is a schematic diagram of a first portion of the control circuit of the output power supply shown in FIG. 7.
Figure 9:
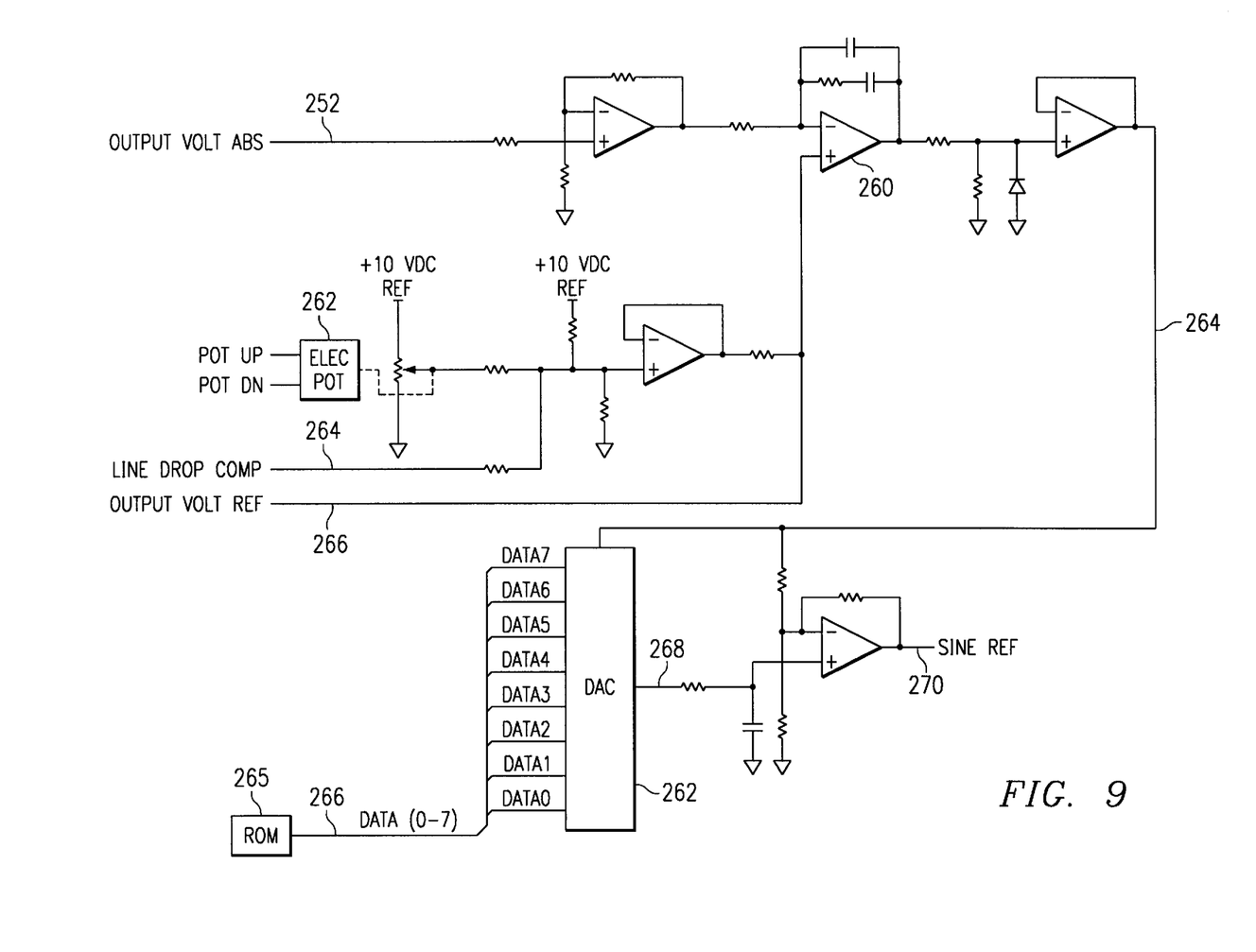
FIG. 9 is a schematic diagram of a second portion of the control circuit of the output power supply shown in FIG. 7.
Figure 10:
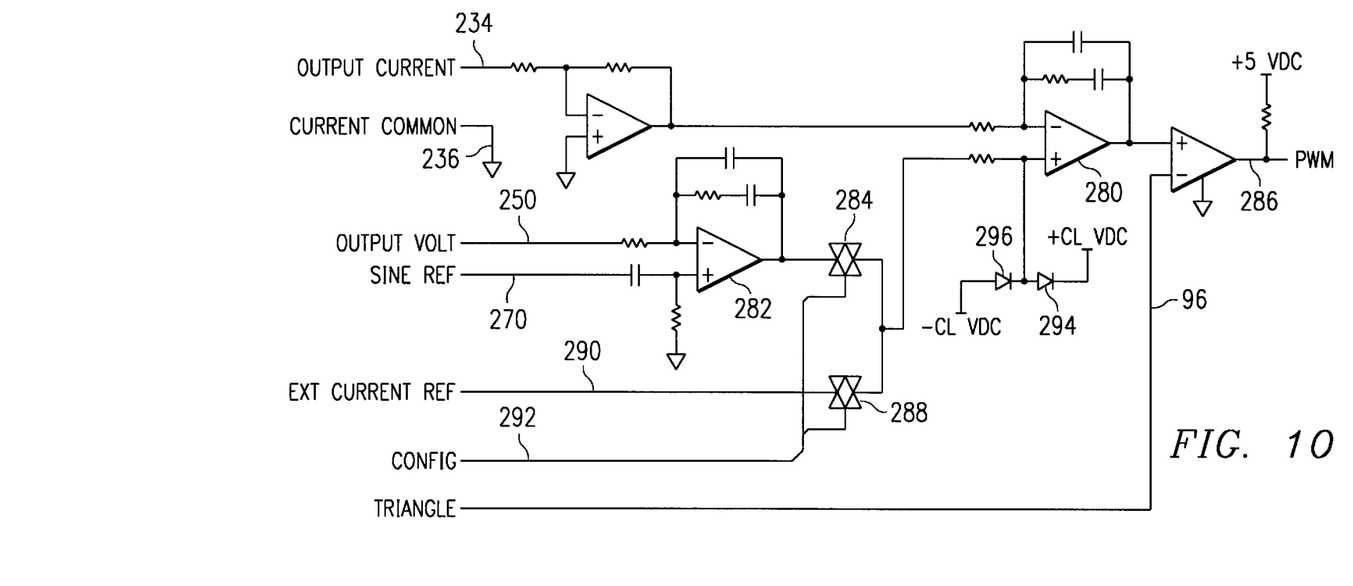
FIG. 10 is a schematic diagram of a third portion of the control circuit of the output power supply shown in FIG. 7.

Control circuit 222 is shown in detail in FIGS. 8, 9, and 10. Referring to FIG. 8, the negative and positive output voltage at terminals 204 and 202, respectively, are converted to a single-ended voltage signal, output volt, on line 250, and full wave rectified to provide a rectified signal, output volt abs, on line 252.

In FIG. 9 output volt abs is scaled and coupled into one input of operational amplifier 260. The output voltage can be adjusted by the user with the electrical potentiometer 262 which can be adjusted up and down. Also a dynamic adjustment can be made with a voltage signal applied to the line drop compensation input 264. Additionally, an output voltage reference signal on input terminal 266 can be used to provide a reference for power supply 200 when it is used as a slave power supply to a primary power supply. The voltage at input terminal 266 is also controlled by other circuits (not shown) in control circuit 222 to reduce the output voltage of power supply 200 during overload conditions to provide current limiting protection. The three reference signals are combined and applied to the other input of operational amplifier 260 which is configured as a low pass filter to provide an essentially DC output signal. The output of operational amplifier 260 on line 264 is scaled and applied as the reference input to digital-to-analog convertor 262. A ROM 265 produces digital sinusoidal signals on data (0–7) input bus 266 which are input to the DAC 262 to produce an analog sinusoidal signal at its output at node 268. The signal at node 268 is scaled by using the voltage on line 264 as the DAC 262 reference to produce the sine ref signal on line 270.

Referring to FIG. 10 outputs from current monitor 214 on lines 234 and 236 are connected to the output current input and current common inputs, respectively, of FIG. 10. The current input on line 234 is scaled and applied to one input of operational amplifier 280. Output volt on line 250 and sine ref on line 270 are compared in operational amplifier 282 and the resultant error signal can be coupled through switch 284 to the second input of operational amplifier 280. The output of operational amplifier 280, which is also an error signal, is compared to the 18 kHZ triangle input signal on line 96 to form the pulse width modulated signal PWM on line 286 which is used to control the gates of transistors 208 and 210. The second input of operational amplifier 280 can alternatively be coupled through a second switch 288 to an external current reference on input terminal 290. In this configuration, power supply 200 output current is controlled directly by an external voltage source. Switches 284 and 288 are controlled by input signal config at input terminal 292. Only one of switches 284 and 288 are on or conductive at one time. Two diodes 294 and 296, together with DC reference voltages +CL VDC and –CL VDC, are used for current limiting of the output of power supply 200.

In operation control circuit 222 receives the DC voltages, the current monitor 214 output and the output voltage on terminal 202 to control transistors 208 and 210. More specifically, an internal sine wave generator provides a reference sine wave whose amplitude is controlled by the average output voltage of power supply 200 and by one or more adjustment signals. This reference sine wave is compared to the instantaneous output voltage of power supply 200 to produce an error signal, which in turn is compared to the signal from current monitor 214 to produce a second error signal which is then used as one input to a comparator, the second input of which is the 18 kHZ triangle signal to form the signals which are used to drive the gates of transistors 208 and 210.

Figure 11A:
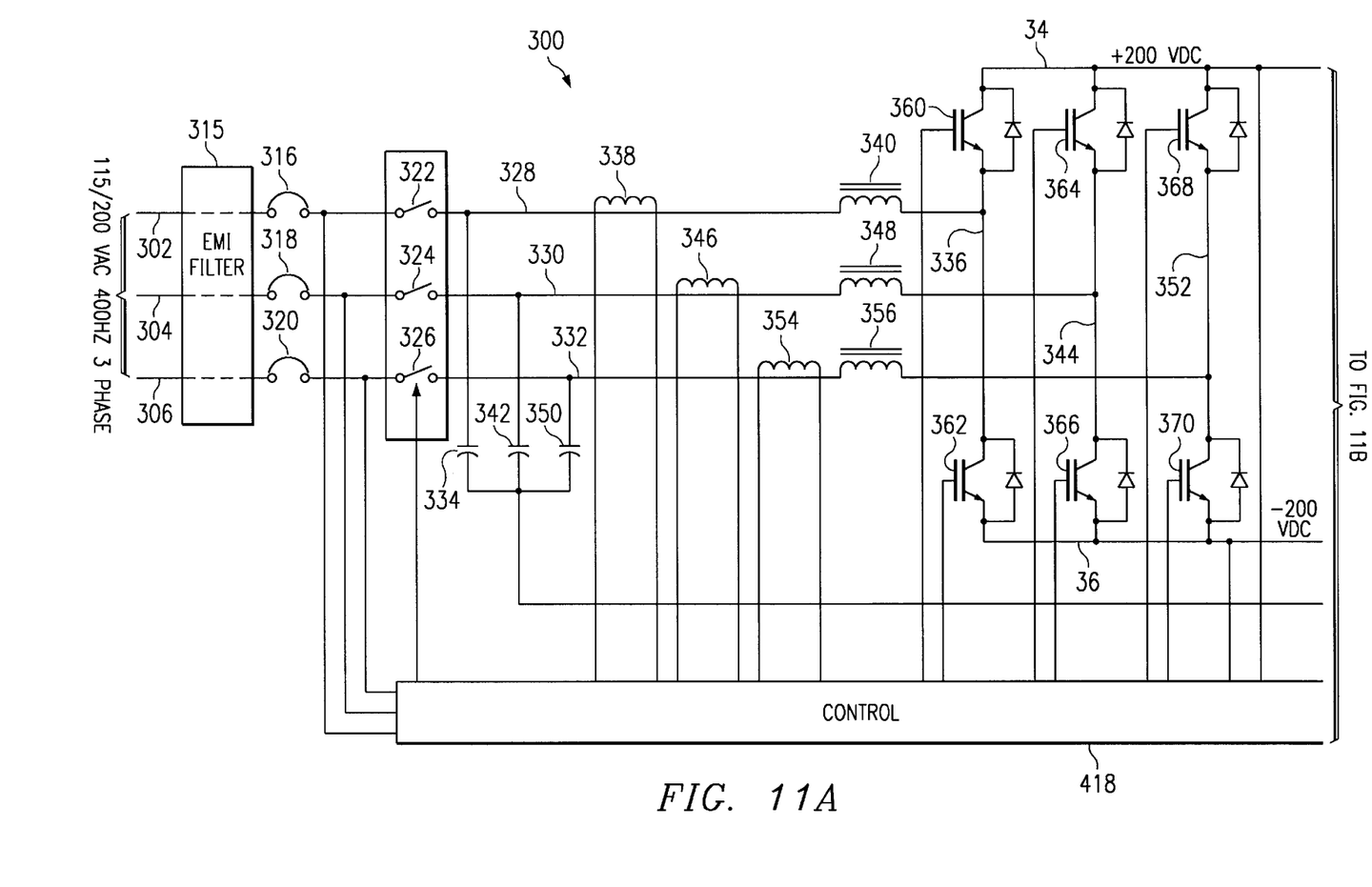
FIGS. 11A and 11B are partial block diagrams, partial schematic diagrams, of a three phase embodiment of the power supplies of FIGS. 1 and 7.
Figure 11B:
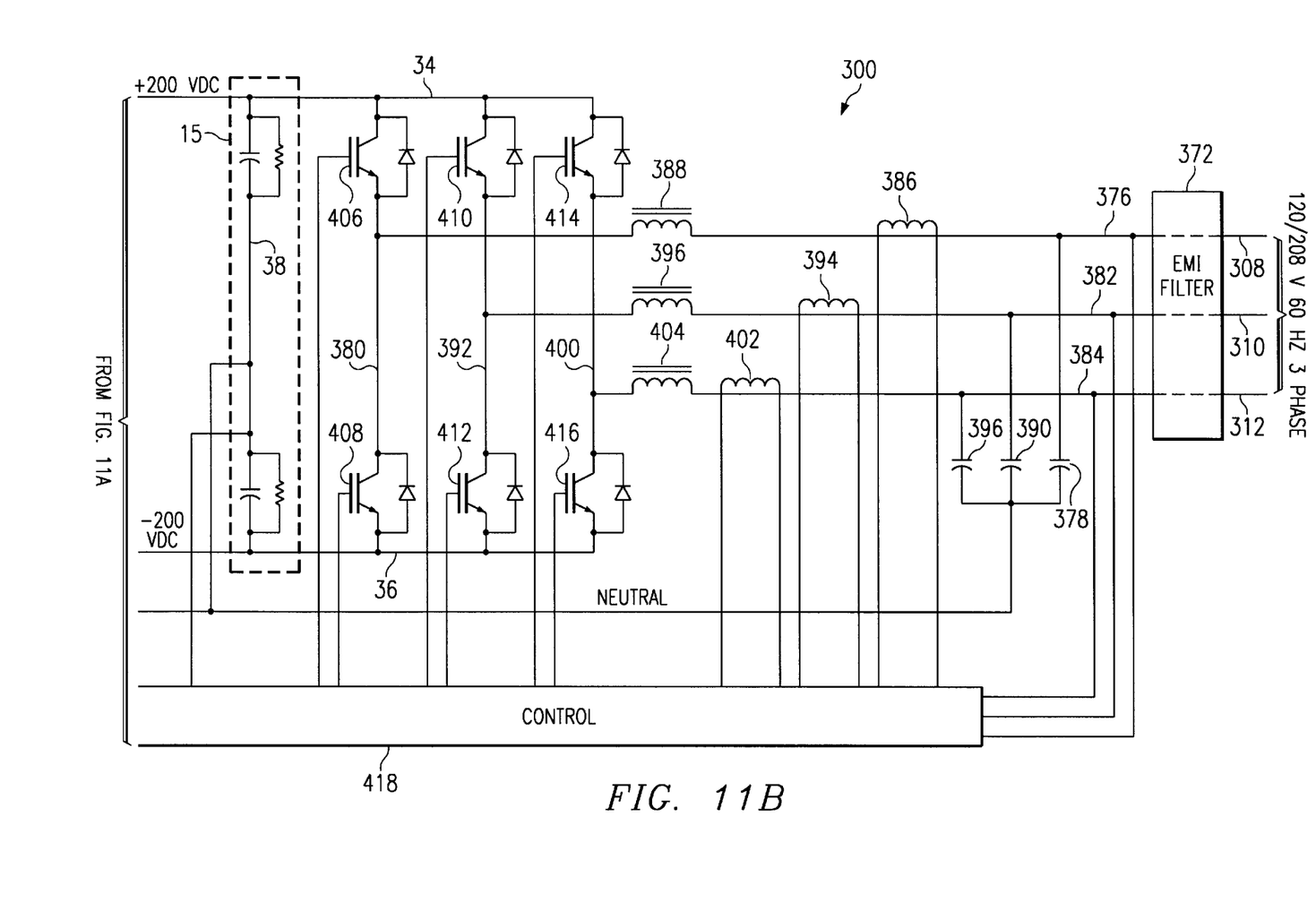

Power supplies 10 and 200 can be modified for two phase and three phase power control. FIGS. 11A and 11B are partial block diagrams and partial schematic diagrams of three phase power controller 300 which receives 115/200 volts (115 volts line to neutral or 200 volts line to line), 400 HZ power, three phase power on input terminals 302, 304, and 306, and provides 120/208 volt, 60 HZ, three phase power at output terminals 308, 310, and 312. Input terminals 302–304 are coupled through EMI filter 315, through three circuit breakers 316, 318, and 320, respectively, and through three static switches 322, 324, and 326, respectively, onto three nodes 328, 330, and 332, respectively. Node 328 is coupled to neutral through capacitor 334 and to node 336 through current monitor 338 and inductor 340. Similarly, node 330 is coupled to neutral through capacitor 342 and to node 344 through current monitor 346 and inductor 348; and node 332 is coupled to neutral through capacitor 350 and to node 352 through current monitor 354 and inductor 356. Nodes 336, 344, and 352 each form three separate common connections for three pairs of N-channel IGBT switching transistors (with shunt diodes) 360 and 362, 364 and 366, and 368 and 370, respectively. The collectors of transistors 360, 364, and 366 are connected to positive DC voltage node 34, and the emitters of transistors 362, 366 and 370 are connected to negative DC voltage node 36. Nodes 34 and 36 are common to capacitor section 15.

Output terminals 308–312 are coupled through EMI filter 372 onto three nodes 376, 382, and 384, respectively. Node 376 is coupled to neutral through capacitor 378 and to node 380 through current monitor 386 and inductor 388. Similarly, node 382 is coupled to neutral through capacitor 390 and to node 392 through current monitor 394 and inductor 396; and node 384 is coupled to neutral through capacitor 398 and to node 400 through current monitor 402 and inductor 404. Nodes 380, 392, and 400 each form the separate common connection for three pairs of N-channel IGBT switching transistors (with shunt diodes) 406 and 408, 410 and 412, and 414 and 416, respectively. The collectors of transistors 406, 410, and 414 are connected to positive DC voltage node 34, and the emitters of transistors 408, 412 and 416 are connected to negative DC voltage node 36.

Control circuit 418 controls the gates of transistors 360–370 and 406–416 with inputs from input terminals 302–306, output terminals 308–312, current monitors 338, 346, 354, 386, 394, and 402, and the positive and negative DC voltages at nodes 34 and 36, respectively, and from neutral.

In operation, control circuit 418 essentially controls each pair of transistors independently based on the respective input or output voltages, currents and the common DC voltage. For example the signals to the gates of transistor pair 360–362 are a function of input terminal voltage 302, the current through current monitor 338, and the DC voltages and neutral, and are controlled separately from the other inputs to control circuit 418. Similarly, the signals to the gates of transistor pair 406–408 are a function of output terminal voltage 308, the current through current monitor 386, and the DC voltages and neutral, and are controlled separately from the other inputs to control circuit 418. Each of the output voltage terminals 308–312 is regulated using a separate internal sinusoidal reference signal each of which is phase controlled with respect to the other sinusoidal reference signals. The separate regulator circuits for each of the six transistor pairs share common power supplies, common reference voltages, and other common signals. In this manner each phase of the three phase input signal into terminals 302–306 has a well controlled power factor into the converter 300.

Figure 12A:
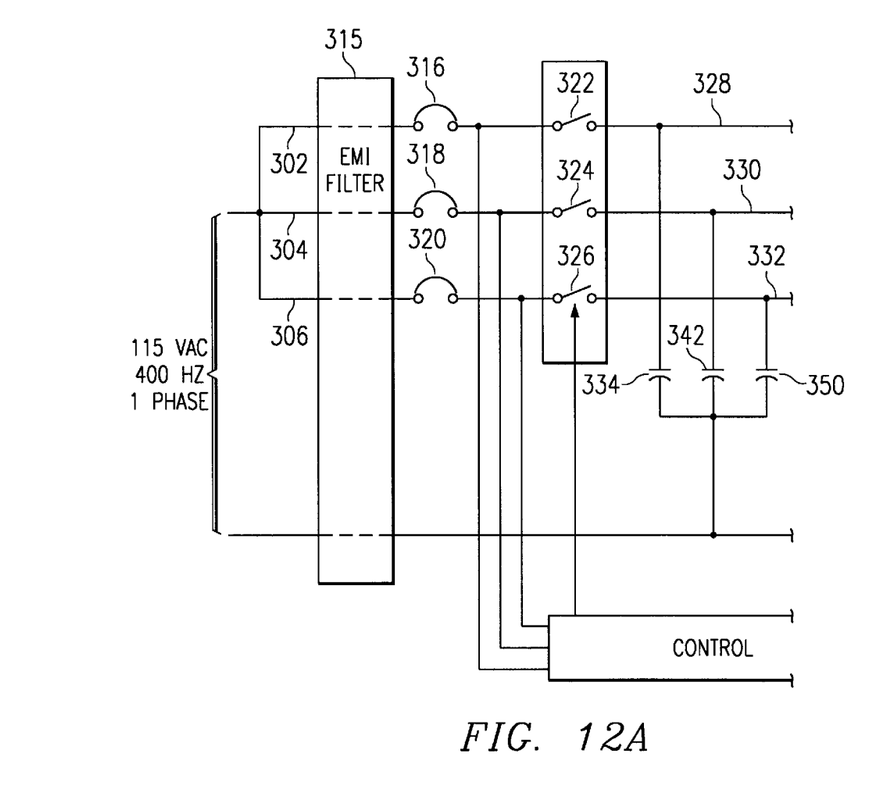
FIGS. 12A and 12B are block diagrams of the input and output connections of the circuit of FIGS. 11A and 11B, respectively, for an alternative one phase embodiment according to the present invention.
Figure 12B:
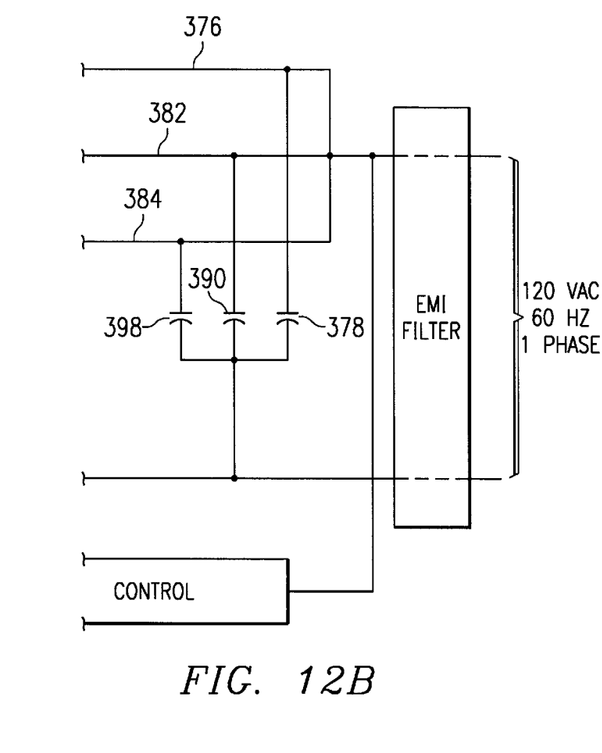

The power converter 300 of FIG. 11A can be used to receive single phase power and/or provide single phase power. FIG. 12A shows the input portion of FIG. 11A in which input terminals 302–306 are connected together to the signal phase input. The power converter 300 input portion operates as before with the combination of six transistors 360–370 providing greater power capabilities than a single pair of transistors, and with automatic regulated power sharing among the six transistors by the control circuitry. FIG. 12B shows the output portion of FIG. 11B wherein the three nodes 376, 382, and 384 are connected together to form a single output terminal. Control circuit 418 must be modified so that a single common sinusoidal reference is use to control the gates of transistors 406–416. Otherwise, the control of transistors 406–416 is the same.

Figure 13A:
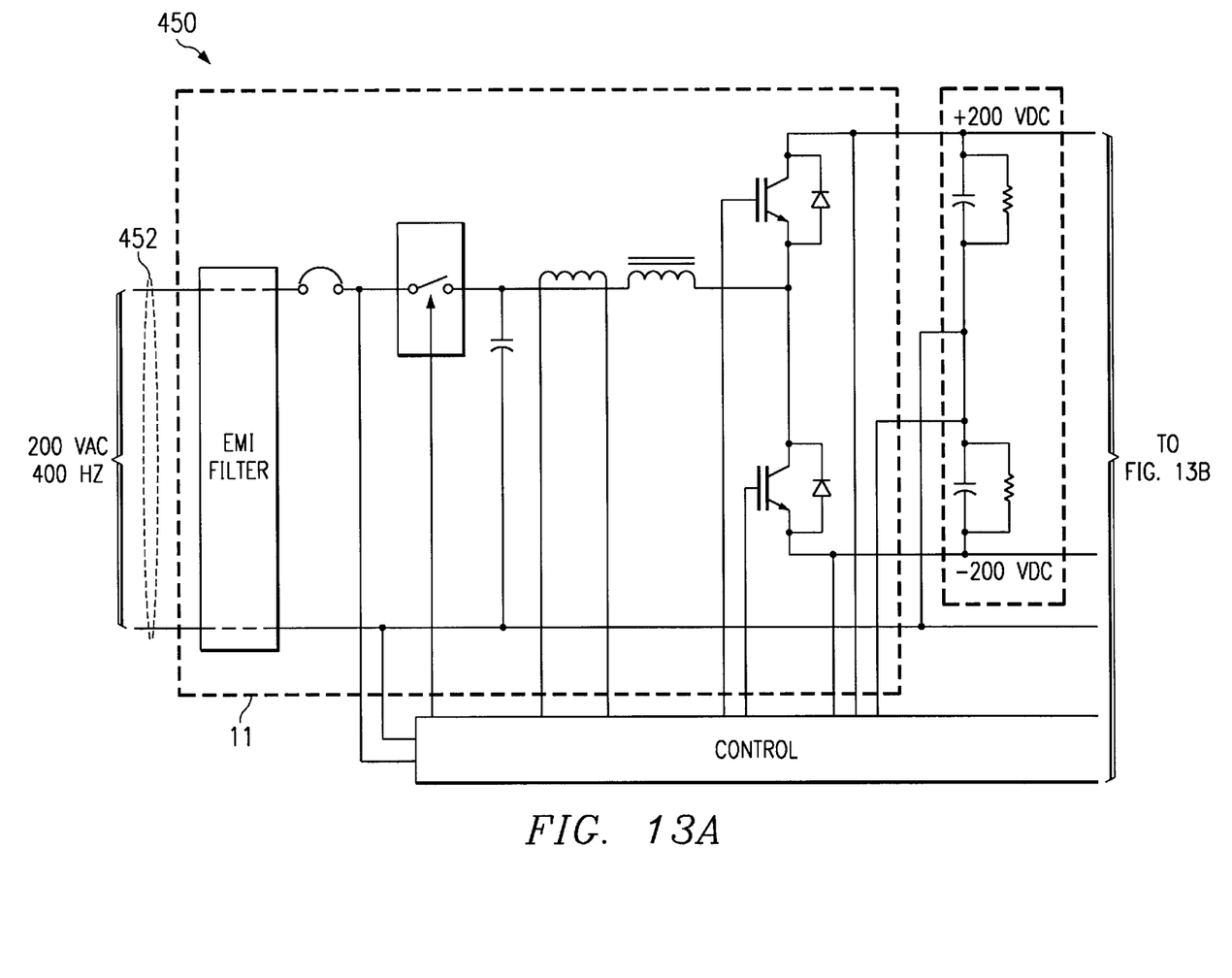
FIGS. 13A and 13B are partial block diagrams, partial schematic diagrams, of a power grid interface circuit according to the present invention.
Figure 13B:
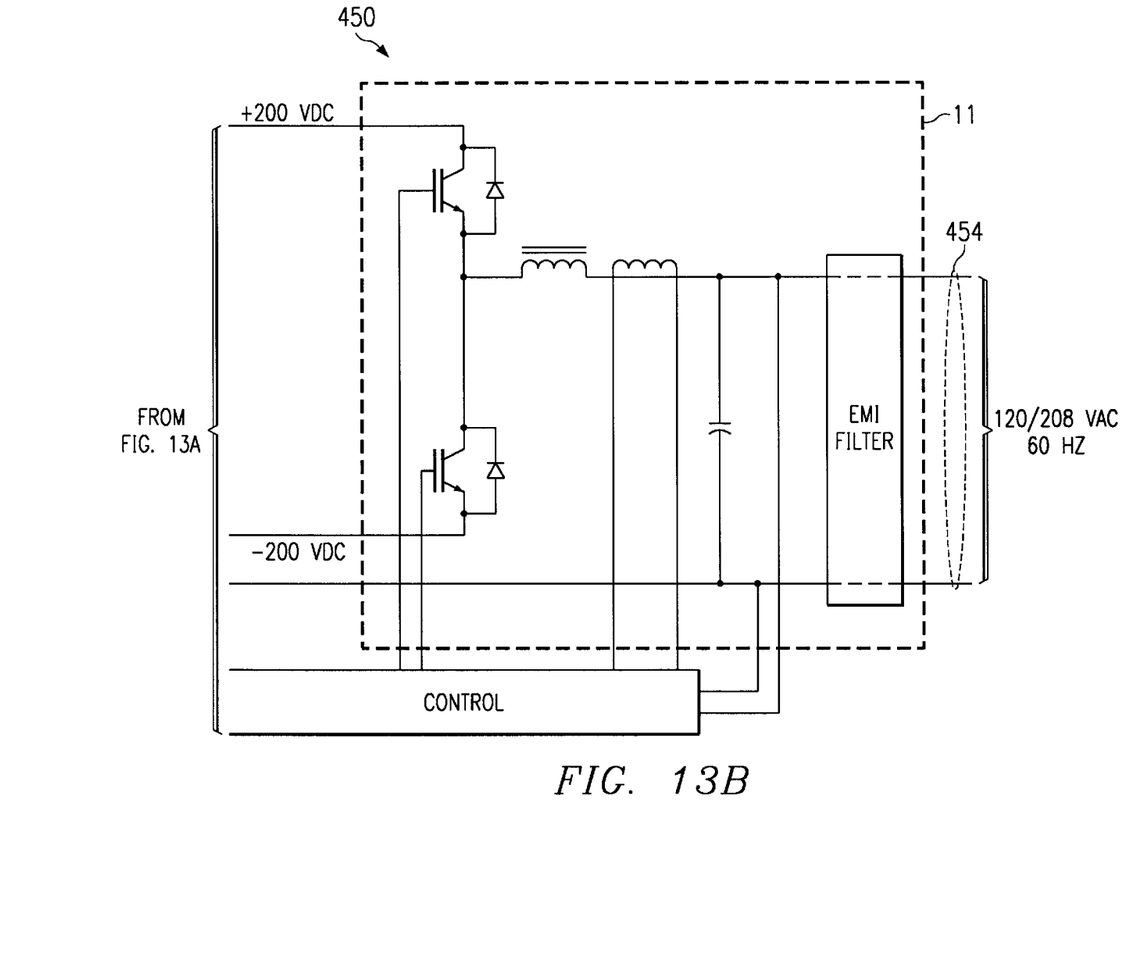

Power supply 10 of FIG. 1 not only passes regulated power from the input terminal 12 to the capacitor section 15, but will also transfer power from the capacitor section 15 to the input terminal 12. As a consequence, the input section 11 of power supply 10 of FIG. 1 can be schematically flipped and connected to the right side of capacitor section 15 to form a power grid interface circuit 450 as shown in FIGS. 13A and 13B. The two input sections 11 operate essentially independent of each other. The power grid interface circuit 450 is connected at the left input terminals 452 to a utility power grid (not shown), and the right input terminals 454 can be connected to an unregulated and unsynchronized power source (not shown). Power grid interface circuit 450 will provide a load with an almost ideal power factor to the unregulated and unsynchronized power source and yet provide power to the utility power grid which is synchronized with an excellent power factor interface. The unregulated and unsynchronized power source can vary widely in frequency, perhaps down to DC and up to at least 800 HZ. Moreover, the unregulated and unsynchronized power source need not provide a sinusoidal signal, but can be of almost any shape and amplitude.

Figure 14:
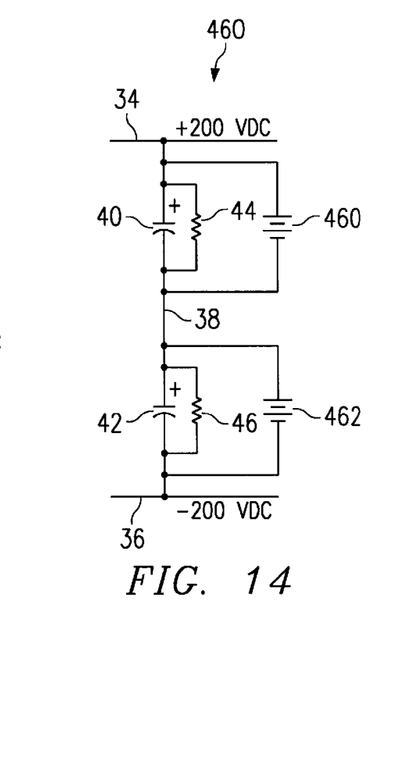
FIG. 14 is a circuit diagram showing the addition of batteries to the DC voltage capacitors of FIGS. 1, 7, and 13.

FIG. 14 shows capacitor section 460 which is a modification of capacitor section 15 in which battery banks 460 and 462 are shunted across capacitors 40 and 42. With the batteries power supply 10 of FIG. 1 would become a battery charger which would have a superior input power factor compared to a common rectifier battery charger. Since, in some applications, the power factor is taken into consideration by a utility company in calculating the rate to bill a customer, the battery charger according to the present invention could save money for such utility customers.

With the batteries of FIG. 14 the combination of power supplies 10 and 200 of FIGS. 1 and 7, or power supply 200 of FIG. 7, or power supply 300 of FIGS. 11A and 11B or 12A and 12B could become a backup power supply. For power supply 200 of FIG. 7, additional circuitry, well known in the art, is required to sense normal input voltage and degraded input voltage so that control circuit 222 operates as control circuit 15 during normal operation, and control circuit 222 operates as described above during degraded input voltage conditions. A circuit (not shown) detects normal from degraded input voltage conditions and to isolate the primary power source from the power supply and the load during degraded input voltage conditions.

Although the invention has been described in part by making detailed reference to a certain specific embodiment, such detail is intended to be, and will be understood to be, instructional rather than restrictive. It will be appreciated by those skilled in the art that many variations may be made on the structure and mode of operation without departing from the spirit and scope of the invention as disclosed in the teachings contained herein. For example the compensation of differentiating circuit 116 can be adjusted to also compensate for reactance in the power transmission lines between primary power source 13 and the power supply 10.

What is claimed is:

1. A method for regulating input current distortion in a power supply comprising the steps of:
   a) monitoring both the voltage applied to the power supply input and a portion of the current transferred between the power source and the power supply; and
   b) regulating the current transferred based, at least in part, on the monitored voltage and monitored current so that the monitored current is out of phase by a regulated amount with the monitored input voltage and the whole of the current transferred between the power source and the power supply is substantially in phase with the monitored voltage.

2. The method set forth in claim 1 further including the step of monitoring a DC voltage produced by the power supply and providing a reference voltage, and regulating the power supply DC voltage based on the monitored voltage, the monitored current, the DC voltage and the reference voltage.

3. The method set forth in claim 1 wherein said monitored current is the portion of the current transferred between the primary power source and the power supply measured with at least a shunt capacitor in the power supply between the current monitor and the primary power source such that part of the current transferred between the primary power source and the power supply passes through the shunt capacitor and is not monitored by the current monitor.

4. The method set forth in claim 1 wherein power is transferred mainly from the primary power source to the power supply.

5. The method set forth in claim 1 wherein power is transferred mainly from the power supply to the primary power source.

6. A power supply which can transfer power both to and from a primary power source while regulating the distortion of the current transferred between said power supply and said primary power source comprising:
   (a) an inductor having a first end and a second end, said first end coupled to an input terminal connectable to said primary power source, said second end coupled to an emitter of a first transistor and a collector of a second transistor;
   (b) a current monitor positioned to monitor the current through said inductor;
   (c) a capacitance circuit coupled between a collector of said first transistor and an emitter of said second transistor;
   (d) a control circuit which has outputs which control the conduction of said first and second transistors so that said monitored current is in a regulated phase relationship with the phase of the voltage at said input terminal, said phase relationship being one of not being in phase.

7. The power supply set forth in claim 6 wherein the power supply does not have transformer coupling of the primary power through the power supply.

8. A frequency converter which can transfer power both to and from a primary power source to a load wherein said primary power source and said load have voltages associated therewith which are of different frequencies comprising:
   (a) an input section comprising:
      (i) a first inductor having a first end and a second end, said first end coupled to an input terminal connectable to said primary power source, said second end coupled to an emitter of a first transistor and a collector of a second transistor;
      (ii) a first current monitor positioned to monitor the current through said first inductor;
      (iii) a capacitance circuit coupled between a collector of said first transistor and an emitter of said second transistor;
   (b) an output section comprising:
      (i) a second inductor having a first end and a second end, said first end coupled to an output terminal connectable to said load, said second end coupled to an emitter of a third transistor and a collector of a fourth transistor, the collector of said first transistor coupled to and the collector of said third transistor and the emitter of said second transistor coupled to the emitter of said fourth transistor;
      (ii) a second current monitor positioned to monitor the current through said second inductor;
   (c) a sinusoidal voltage reference circuit having an output sinusoidal signal whose frequency is associated with said load; and
   (d) a control circuit coupled to said sinusoidal voltage reference circuit has outputs which control the conduction of said first, second, third, and fourth transistors so that said first monitored current is in a regulated phase relationship with the phase of the voltage at said input terminal and said second monitored current is in a regulated phase relationship with said output sinusoidal signal.

9. A power grid interface circuit which can transfer power to a primary power source from a secondary power source comprising:
   (a) an power grid section comprising:
      (i) a first inductor having a first end and a second end, said first end coupled to a first terminal connectable to said primary power source, said second end coupled to an emitter of a first transistor and a collector of a second transistor;
      (ii) a first current monitor positioned to monitor the current through said first inductor;
      (iii) a capacitance circuit coupled between a collector of said first transistor and an emitter of said second transistor;
   (b) a secondary source section comprising:
      (i) a second inductor having a first end and a second end, said first end coupled to a second terminal connectable to said second power source, said second end coupled to an emitter of a third transistor and a collector of a fourth transistor, the collector of said first transistor coupled to and the collector of said third transistor and the emitter of said second transistor coupled to the emitter of said fourth transistor;
      (ii) a second current monitor positioned to monitor the current through said second inductor; and
   (c) a control circuit which has output signals which control the conduction of said first, second, third, and fourth transistors so that said first monitored current is in a regulated phase relationship with the phase of the voltage at said first terminal and said second monitored current is in a regulated phase relationship with the voltage of said second terminal.

* * * * *